United States Patent [19]

Lucky

[11] Patent Number: 4,637,303

[45] Date of Patent: Jan. 20, 1987

[54] COOKING RACK

[76] Inventor: Lloyd P. Lucky, P.O. Box 670803, Chugiak, Ak. 99567

[21] Appl. No.: 715,306

[22] Filed: Mar. 25, 1985

[51] Int. Cl.⁴ ............................................. A47J 37/00
[52] U.S. Cl. ........................................ 99/426; 99/448; 99/450; 126/337 R; 269/305; 269/900; D7/409
[58] Field of Search ......................... 99/426, 448, 450; 211/184; 269/303, 305, 900; 126/332, 337 R, 337 A, 339, 19 R; D7/409

[56] References Cited

U.S. PATENT DOCUMENTS

| | | | |
|---|---|---|---|
| 1,351,415 | 8/1920 | Coumerilh | 126/337 R |
| 2,290,572 | 7/1942 | Rakov | 126/339 |
| 2,520,133 | 8/1950 | Donovan | 126/19 R |
| 2,621,807 | 12/1952 | Rendich | 269/900 X |
| 2,933,195 | 4/1960 | Radek | 211/184 X |
| 3,550,580 | 12/1970 | Wong | 126/337 R |
| 3,669,278 | 6/1972 | Heroy | 211/184 |
| 4,023,682 | 5/1977 | Niece | 211/184 |

Primary Examiner—Billy J. Wilhite
Attorney, Agent, or Firm—Griffin, Branigan & Butler

[57] ABSTRACT

A cooking rack (10) for placement on a cooking surface, such as an existing shelf or tray in an oven. The cooking rack has a plurality of perforations (14) for receiving securing pins 20. A cooking utensil is placed on or under the cooking rack (10) and the securing pins (20) are placed in the perforations (14) to extend above and/or below the rack (10). In this manner the pins (20) are placed around the cooking utensil to prevent it from sliding. The securing pins (20) can also extend below the cooking rack (10) and engage the cooking surface to prevent the cooking rack from moving relative to the cooking surface.

16 Claims, 3 Drawing Figures

U.S. Patent   Jan. 20, 1987   4,637,303
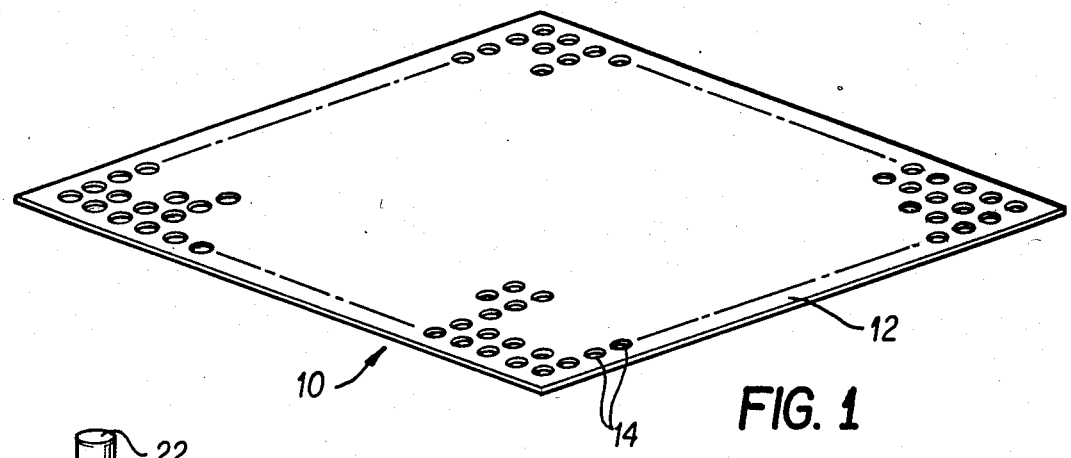
FIG. 1
FIG. 2
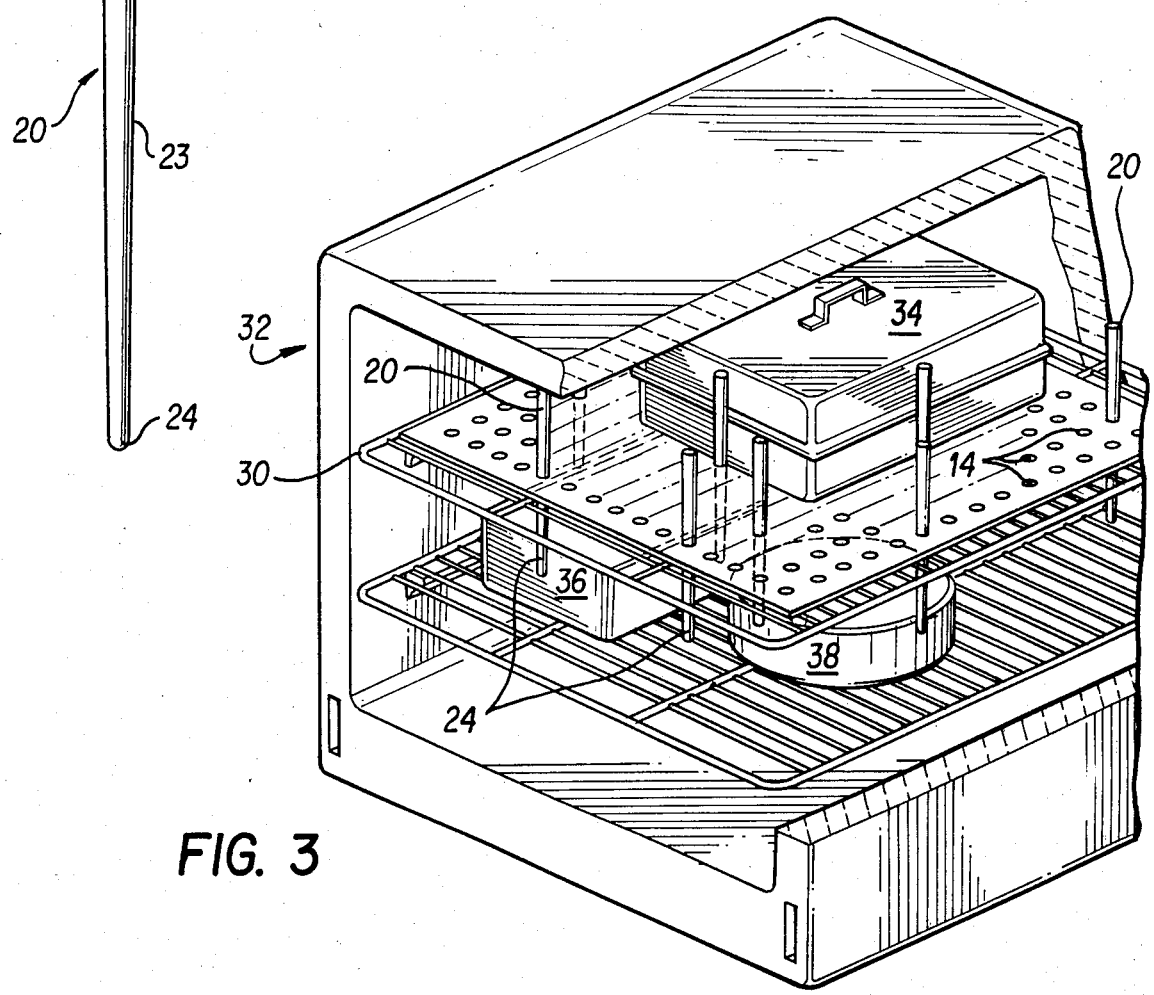
FIG. 3

COOKING RACK

BACKGROUND OF THE INVENTION

The invention relates to a cooking rack for use on a cooking surface. In this respect, stove tops and ovens on many vehicles are often bounced about; and, during stormy weather, seagoing vessels are often tossed at sea. In such instances, it is difficult to cook as the pots and pans placed on a stove top or in an oven tend to tip over. Moreover, cooks in such instances are often severely burned by the contents of the pots and the like. Hence, it is important to ensure that such utensils do not move when placed on a cooking surface. Accordingly, the instant invention provides a cooking rack that securely holds a cooking utensil, such as a pot or pan, on the cooking surface during such bouncing and turbulence. In this manner, the contents of the utensils are retained so that there is a reduction in the possibility of injury to the attending cooks.

U.S. Pat. No. 3,550,580 to Wong discloses a movable tray for use with an oven. Movable tray 15 has a plurality of perforations 18 therein and is supported on an existing oven grill 3 by means of wheels 21,22 and roller 25. Chains 50 and 51 are secured to the tray 15 and grill 3 to prevent the tray from moving more than a predetermined distance. This type of tray does not provide any means to prevent movement of a cooking utensil placed on the tray.

U.S. Pat. No. 2,290,572 to Rakov discloses a stove utility drawer. Stove 1 is provided with a compartment 4 in which a drawer 5 is mounted. This drawer may be pulled forward. Shelf 16 is disposed in the drawer and is provided with a plurality of openings 21 of different shapes and sizes for receiving the lower portions of dishes of corresponding shapes and sizes. Such a shelf, however, cannot accommodate cooking utensils that do not fit in the openings 21. Additionally, the shelf cannot be used with existing ovens and stove tops without considerable modification.

U.S. Pat. No. 2,520,133 to Donovan discloses an oven rack. The rack has a series of apertures 17 for the convection and the radiation of heat from the bottom to the top of the oven. This type of oven rack does not secure cooking utensils to the rack to prevent them from sliding or tipping.

In view of the foregoing, it is an object of the present invention to create an improved cooking rack that is simple to manufacture, but still prevents an item being cooked from sliding, tipping or falling and injuring a cook.

An advantage of the invention is that it does not require alteration to the cooking surface upon which the utensils are to be placed; and, can easily be used to retrofit existing ovens or stoves.

Another advantage of the present invention is that it is capable of easily accommodating cooking utensils of various sizes. Moreover, a single rack of the invention can be used to retain utensils that can be selectively located either above or below the rack.

Still another advantage of the invention is that it prevents water and greases from spilling and causing fires and/or necessitating replacement of expensive parts.

SUMMARY

A perforated cooking rack for placement on a cooking surface, such as an existing rack in an oven or on a stove top, surrounding a heat source. The cooking rack has a plurality of perforations therein for receiving a plurality of securing pins. The cooking utensils are placed on or under the cooking rack and the securing pins are placed in the perforations around the cooking utensils to hold the utensils in place. In an oven environment the securing pins also extend through the conventional oven rack to engage the conventional rack and prevent the cooking rack from moving relative to the oven.

BRIEF DESCRIPTION OF THE DRAWINGS

FIG. 1 is a perspective view of a cooking rack of the invention; and,

FIG. 2 is a view of a securing pin.

FIG. 3 is a pictorial view of the FIG. 1 rack installed in an oven.

DETAILED DESCRIPTION OF THE DRAWINGS

A cooking rack 10 is manufactured from stainless steel or the like in order to withstand the heat that is generated during cooking.

The cooking rack 10 comprises a sheet such as a substantially square, flat plate 12 having a plurality of receiving means such as perforations 14. In the preferred embodiment, plate 12 measures fourteen inches wide deep by fourteen inches deep by ⅛ inch thick. The perforations are approximately ⅜ inch in diameter. The exact dimensions are not critical; the sizes having been chosen to accommodate a variety of ovens while the thickness of the plate is determined by the material used for its manufacture. In this respect, the plate 12 need only be thick enough to resist flexing and/or warpage. Likewise, the diameter of the perforations is chosen to accommodate pins 20 and to allow heat to circulate and penetrate through the plate to evenly cook food that may be located above the plate.

A plurality of securing means, such as securing pins 20 are associated with the cooking rack 10. Securing pins 20 are also manufactured from a heat-resistant material, such as stainless steel. Each pin has a rounded head 22, a tapered body portion 23, and an end portion 24. The length of the pins is not critical, but in a preferred embodiment, each securing pin is four to eight inches long. The taper of the pin is selected so that when the securing pin 20 is inserted in a perforation 14 of plate 12, a sufficient portion of the pin protrudes below the cooking rack to engage pots or pans located on the shelf below; and/or a sufficient portion of the pin extends above the rack to engage pots or pans located on the rack itself.

In use, the cooking rack 10 is placed on or above a cooking surface, such as a conventional wire oven rack 30 (FIG. 3) in an oven 32. Cooking utensils, such as pots or pans 34,36,38 are placed on or under the cooking rack 10 as shown in FIG. 3 and a plurality of securing pins 20 are inserted through the perforations 14 so that they surround the cooking utensils. The ends 24 extend below the cooking rack 10 and engage both the existing oven rack 30 and the pots and pans 34, 36, and 38 as shown. In this fashion, the securing pins 20 secure the cooking utensils to the cooking rack 10 while also anchoring the rack 10 to the cooking rack 30 of the oven 32.

While the invention has been particularly shown and described with reference to a preferred embodiment thereof, it will be understood by those skilled in the art that various alterations in form and detail may be made therein without departing from the spirit and scope of the invention. For example, a constant-diameter pin having suitable shoulders thereon could be used in place of a tapered pin; and, the rack 10 can also be affixed above a range top so that pins therethrough can engage utensils on the cooking surface below.

The embodiments of the invention in which an exclusive property or privilege is claimed are defined as follows:

1. A cooking rack assembly for preventing relative motion of cooking utensils during cooking, said assembly comprising:
   a plurality of pin means;
   plate means positioned on a support means at a plurality of points to rigidly support said plate means relative to a cooking utensil;
   a plurality of perforations on said plate means for receiving said pin means;
   said pin means being selectively locatable on said plate means so that at least portions of said pin means extend outwardly from selected locations on said plate means for engaging said utensil and preventing said utensil from movement relative to said plate means, said pin means extending through said perforations so that a portion thereof extends from one side of said plate means and a portion thereof extends from the other side of said plate means.

2. A cooking rack as recited in claim 1 wherein said plate means and said pin means are manufactured from a heat resistant material.

3. A cooking rack as recited in claim 1 wherein said pin means protrudes from said plate means and engages said support means to prevent movement of said plate means relative to said support means.

4. A cooking rack as recited in claim 3 wherein said receiving means comprises a plurality of perforations in said plate means.

5. A cooking rack as recited in claim 4 wherein said pin means extend through said perforations so that a portion thereof extends from one side of said plate means and a portion thereof extends from the other side of said plate means.

6. A cooking rack as recited in claim 3 wherein said plate means and said pin means are manufactured from a heat resistant material.

7. A cooking rack as recited in claim 1 wherein said pin means are tapered.

8. A cooking rack as recited in claim 7 wherein said receiving means comprises a plurality of perforations in said plate means and wherein said tapered pins extend through said perforations so that a portion of said pin means extends below said plate means and a portion of said pin means extends above said plate means.

9. A cooking rack as recited in claim 7 wherein said plate means and said pin means are manufactured from a heat resistant material.

10. A cooking rack as recited in claim 7 wherein said pin means protrudes from said plate means and engages said support means to prevent movement of said plate means relative to said support means.

11. A cooking rack as in claim 10 wherein said plate means and pin means are made of stainless steel.

12. A cooking rack as recited in claim 1 wherein said plate means has a thickness sufficient to prevent flexing and warpage when subjected to a load.

13. A cooking rack assembly for preventing relative motion of cooking utensils during cooking, said assembly comprising:
   a plurality of tapered pins made from a heat-resistant material;
   a flat, heat-resistant plate means having a plurality of perforations therein;
   support means to rigidly support said plate means relative to said cooking utensils;
   said tapered pins being selectively insertable into selected ones of said perforations so that portions of said selectively insertablie pins extend from one side of said plate means and portions of said pins extend from the other side of said plate means for location against utensils positioned adjacent thereto to prevent motion of said utensils relative to said pins.

14. The cooking rack assembly of claim 13 where at least one of said tapered pins engages said support means to prevent motion of said plate means relative to said support means.

15. The cooking rack assembly of claim 13 wherein said plate means and pins are made from stainless steel.

16. The cooking rack assembly of claim 13 wherein said plate means has a thickness sufficient to prevent flexing and warpage when subjected to a load.

* * * * *